US012110650B2

(12) United States Patent
Suzuki

(10) Patent No.: US 12,110,650 B2
(45) Date of Patent: Oct. 8, 2024

(54) WORK MACHINE

(71) Applicant: Hitachi Construction Machinery Co., Ltd., Tokyo (JP)

(72) Inventor: Kazuyoshi Suzuki, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 645 days.

(21) Appl. No.: 17/419,783

(22) PCT Filed: Jan. 14, 2020

(86) PCT No.: PCT/JP2020/000912
§ 371 (c)(1),
(2) Date: Jun. 30, 2021

(87) PCT Pub. No.: WO2020/183891
PCT Pub. Date: Sep. 17, 2020

(65) Prior Publication Data
US 2022/0074164 A1 Mar. 10, 2022

(30) Foreign Application Priority Data
Mar. 11, 2019 (JP) ................................ 2019-043647

(51) Int. Cl.
*E02F 3/42* (2006.01)
*E02F 3/30* (2006.01)
(Continued)

(52) U.S. Cl.
CPC .............. *E02F 3/425* (2013.01); *E02F 3/308* (2013.01); *E02F 9/2228* (2013.01); *F15B 13/02* (2013.01);
(Continued)

(58) Field of Classification Search
CPC ..... E02F 9/2282; E02F 9/2285; E02F 9/2267; E02F 3/308; E02F 3/425; F15B 21/14; F15B 15/10
See application file for complete search history.

(56) References Cited

U.S. PATENT DOCUMENTS

2003/0150210 A1 8/2003 Shimada
2012/0304630 A1 12/2012 Kawasaki et al.

FOREIGN PATENT DOCUMENTS

JP 4213473 B2 1/2009
JP 2011-179541 A 9/2011
(Continued)

OTHER PUBLICATIONS

International Search Report (PCT/ISA/210) issued in PCT Application No. PCT/JP2020/000912 dated Mar. 24, 2020 with English translation (four (4) pages).
(Continued)

*Primary Examiner* — Kenneth Bomberg
*Assistant Examiner* — Daniel S Collins
(74) *Attorney, Agent, or Firm* — Crowell & Moring LLP

(57) ABSTRACT

A connection switching device (45) connects a bottom-side oil chamber (15C) of a boom cylinder (15) and a bottom-side oil chamber (16C) of an arm cylinder (16) when a boom operating device (22A) instructs the contraction of the boom cylinder (15) and an arm operating device (21B) instructs the expansion of the arm cylinder (16). The connection switching device (45) connects the bottom-side oil chamber (15C) of the boom cylinder (15) and a rod-side oil chamber (16D) of the arm cylinder (16) when the boom operating device (22A) instructs the contraction of the boom cylinder (15) and the arm operating device (21B) instructs the contraction of the arm cylinder (16).

3 Claims, 5 Drawing Sheets

(51) Int. Cl.
*E02F 9/22* (2006.01)
*F15B 13/02* (2006.01)
*F15B 15/20* (2006.01)
*E02F 9/20* (2006.01)

(52) U.S. Cl.
CPC ............ *F15B 15/20* (2013.01); *E02F 9/2004* (2013.01); *E02F 9/2267* (2013.01); *E02F 9/2271* (2013.01); *E02F 9/2285* (2013.01); *E02F 9/2292* (2013.01)

(56) References Cited

FOREIGN PATENT DOCUMENTS

| | | | |
|---|---|---|---|
| JP | 2015-48857 | A | 3/2015 |
| JP | 2015-48858 | A | 3/2015 |
| JP | 2017-106227 | A | 6/2017 |

OTHER PUBLICATIONS

Japanese-language Written Opinion (PCT/ISA/237) issued in PCT Application No. PCT/JP2020/000912 dated Mar. 24, 2020 (three (3) pages).

Fig 5

| No. | Operation determination | | | | | Cylinder Pressure to which Hydraulic Oil is Supplied | | Pilot Pressure |
|---|---|---|---|---|---|---|---|---|
| | Boom Lowering (BMC Contraction) | Arm Pushing (AMC Expansion) | Arm Pulling (AMC Contraction) | Bucket Cloud (BKC Expansion) | Bucket Dump (BKC Contraction) | | | |
| 1 | ○ | ○ | | | | $Pg > \alpha$ | → | Pa |
| 2 | ○ | | | ○ | | $Pi > \beta$ | → | Pc |
| 3 | ○ | ○ | | ○ | | $Pg > \alpha$, $Pi > \beta$ | → | Pa, Pc |
| 4 | ○ | | ○ | | | $Ph > \gamma$ | → | Pb |
| 5 | ○ | | | | ○ | $Pj > \delta$ | → | Pd |
| 6 | ○ | | ○ | | ○ | $Ph > \gamma$, $Pj > \delta$ | → | Pb, Pd |

WORK MACHINE

TECHNICAL FIELD

The present disclosure relates to a work machine, such as a hydraulic excavator.

BACKGROUND ART

A hydraulic excavator which is a representative example of a work machine is equipped with a front mechanism which is also called a working mechanism. The front mechanism is configured to include a boom (BM), an arm (AM), a bucket (BK), and a boom cylinder (BMC), an arm cylinder (AMC), and a bucket cylinder (BKC) for driving the boom, the arm, and the bucket, for example. For instance, Patent Documents 1 and 2 describe a configuration in which hydraulic oil discharged from a bottom-side oil chamber of a boom cylinder is supplied to a rod-side oil chamber of the boom cylinder when a boom is lowered.

PRIOR ART DOCUMENT

Patent Document

Patent Document 1: Japanese Patent Laid-Open No. 2011-179541
Patent Document 2: Japanese Patent No. 4213473

SUMMARY OF THE INVENTION

According to the arts disclosed in Patent Documents 1 and 2, when a boom cylinder contracts based on the boom's own weight, hydraulic oil discharged from the boom cylinder's bottom-side oil chamber is supplied to the boom cylinder's rod-side oil chamber, thereby, the lowering operation speed of the boom can be increased. However, there is room for more effective use of the hydraulic oil discharged from the boom cylinder.

An object of one aspect of the present disclosure is to provide a work machine which can utilize hydraulic oil discharged from a boom cylinder based on a boom's own weight more effectively to improve work efficiency.

One aspect of the present disclosure is a work machine which includes, a front mechanism which is configured to include a boom, a boom cylinder which drives the boom, at least one working member, and at least one working member driving cylinder which drives the working member, a hydraulic pump which is configured to supply a hydraulic oil to the boom cylinder and the working member driving cylinder, a boom operating device which is configured to instruct the operation of the boom cylinder, at least one working member operating device which is configured to instruct the operation of the working member driving cylinder, a boom directional control valve which is configured to switch flow direction of the hydraulic oil supplied from the hydraulic pump to the boom cylinder in response to the instruction from the boom operating device, and at least one working member directional control valve which is configured to switch flow direction of the hydraulic oil supplied from the hydraulic pump to the working member driving cylinder in response to the instruction from the working member operating device, where the work machine further includes a connection switching device configured to connect a bottom-side oil chamber of the boom cylinder and a bottom-side oil chamber of the working member driving cylinder when the boom operating device instructs the contraction of the boom cylinder and the working member operating device instructs the expansion of the working member driving cylinder, or to connect the bottom-side oil chamber of the boom cylinder and a rod-side oil chamber of the working member driving cylinder when the boom operating device instructs the contraction of the boom cylinder and the working member operating device instructs the contraction of the working member driving cylinder.

According to one aspect of the present disclosure, hydraulic oil discharged from a boom cylinder based on a boom's own weight can be utilized more effectively to improve work efficiency.

BRIEF DESCRIPTION OF THE DRAWINGS

FIG. 5 is an explanatory diagram showing a relationship among operation of the operating levers, cylinder pressures, and pilot pressures supplied to the switching valves.

MODE FOR CARRYING OUT THE INVENTION

Hereinafter, a work machine according to one aspect of the present disclosure will be described in detail with reference to the accompanying drawings, taking as an example a case where the disclosure is applied to a hydraulic excavator. Here, note that each step of the flow chart shown in FIG. 4 uses the notation "S" (for example, Step 1="S1").

Figure 1:
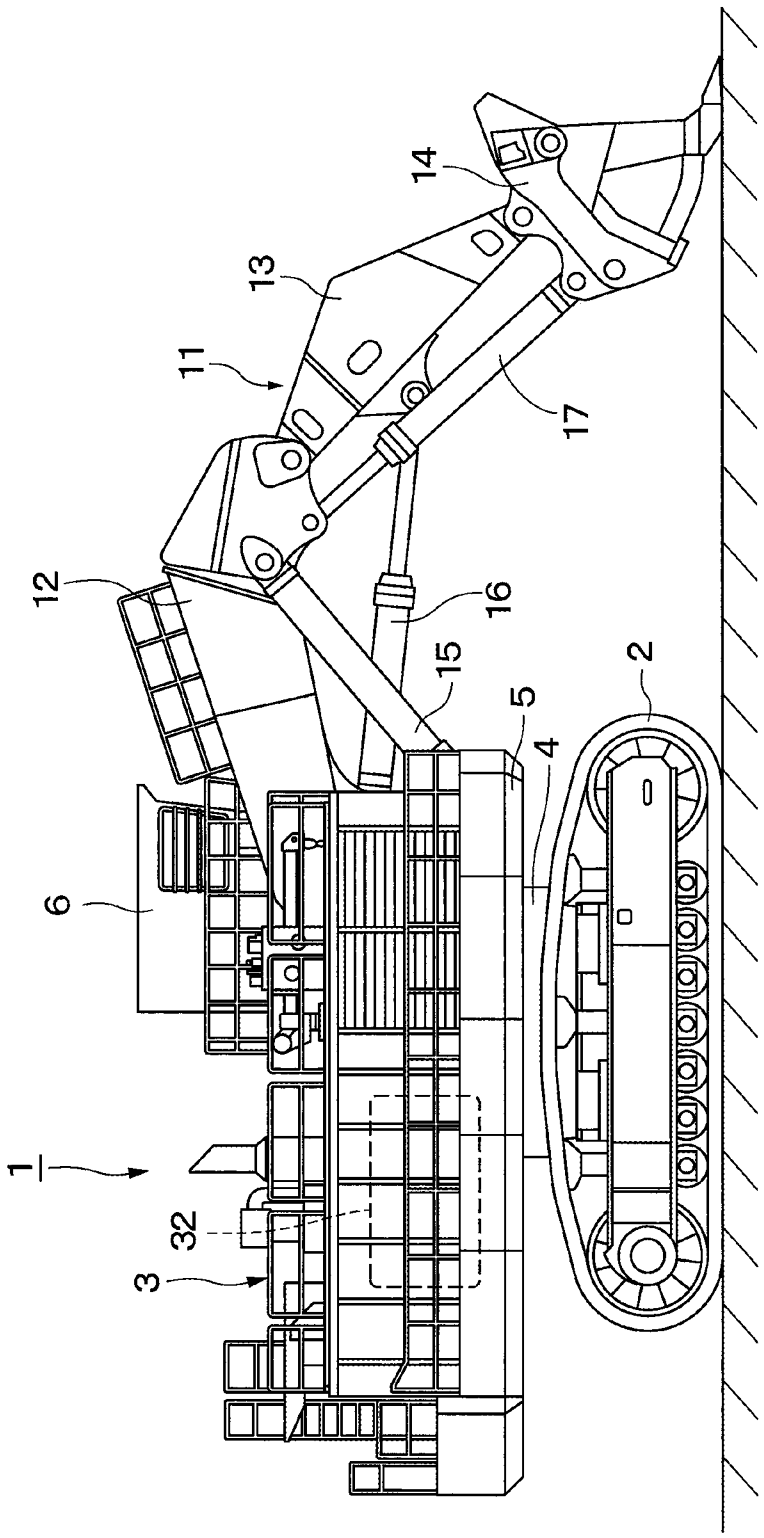
FIG. 1 is a right side view showing a hydraulic excavator according to an embodiment.

In FIG. 1, a hydraulic excavator 1 which is a representative example of a work machine is used for earth and sand excavation, etc. The hydraulic excavator 1 of the embodiment is a super-large hydraulic loading shovel. The hydraulic excavator 1 has an automotive crawler type lower traveling structure 2, an upper revolving structure 3 rotatably mounted on the lower traveling structure 2, and a multi-joint structured front mechanism 11 provided on the front side of the upper revolving structure 3 which performs excavation work, etc. In this case, the lower traveling structure 2 and the upper revolving structure 3 configure a vehicle body of the hydraulic excavator 1.

The front mechanism 11, also called a working mechanism, is configured to include a boom 12, an arm 13 as a first working member, a bucket 14 as a second working member, and a boom cylinder 15, an arm cylinder 16 as a first working member driving cylinder, and a bucket cylinder 17 as a second working member driving cylinder for driving the boom, the arm and the bucket, for example. The boom 12 is attached to a revolving frame 5 of the upper revolving structure 3 at the base end side so that it can swing upward and downward. The boom 12 is swung with respect to the revolving frame 5 as the boom cylinder 15 expands or contracts. The arm 13 is attached to the tip side of the boom 12 so as to be able to swing upward and downward.

The arm 13 is swung with respect to the boom 12 as the arm cylinder 16 expands or contracts. The bucket 14 is swung with respect to the arm 13 as the bucket cylinder 17 expands or contracts. In this way, the front mechanism 11 is driven by the boom cylinder 15, the arm cylinder 16, and the bucket cylinder 17, which are hydraulic cylinders. The boom cylinder 15 drives the boom 12, the arm cylinder 16 drives the arm 13, and the bucket cylinder 17 drives the bucket 14.

Figure 2:
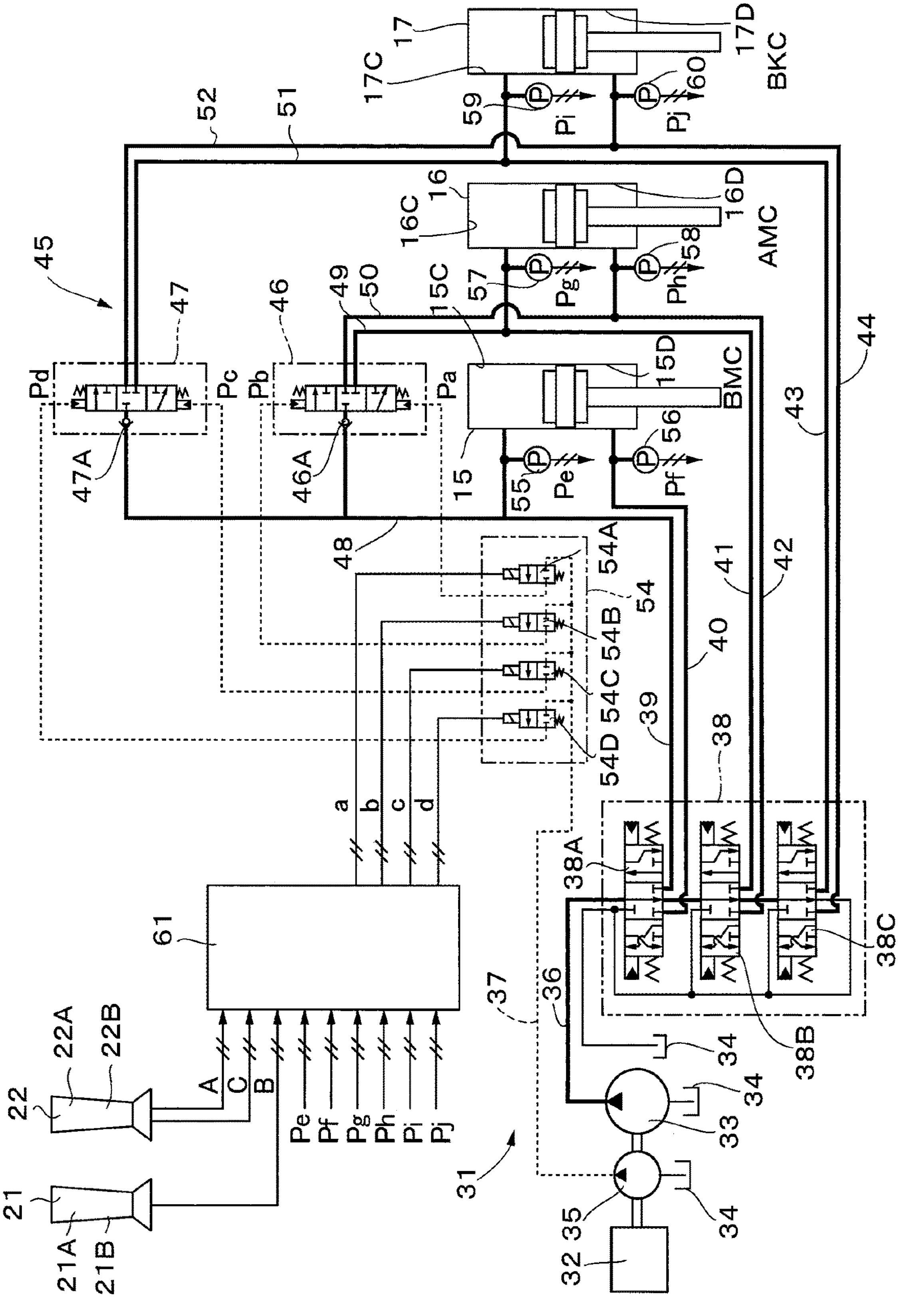
FIG. 2 is a hydraulic circuit diagram of a hydraulic excavator according to an embodiment.

As shown in FIG. 2, the boom cylinder 15, the arm cylinder 16, and the bucket cylinder 17 expand or contract based on the hydraulic oil provided from a hydraulic pump 33. As a result, the position of the front mechanism 11 changes. In this case, the boom cylinder 15, the arm cylinder 16, and the bucket cylinder 17 expand or contract based on lever operation of a left working lever 21 and a right working lever 22, which will be described later, and then, the boom 12, the arm 13 and the bucket 14 are swung.

The inside of a cab 6 provided on the upper revolving structure 3 is an operator cabin for an operator to board. On both left and right sides of the operator's seat, a left working lever operating device 21 (hereinafter referred to as a left working lever 21) and a right working lever operating device 22 (hereinafter referred to as a right working lever 22) are provided as operating devices to be operated by an operator. These left and right working levers 21, 22 are operated when an operator turns the upper revolving structure 3 and drives the front mechanism 11.

The left working lever 21 is configured of a swing operating device 21A (hereinafter referred to as a swing operating lever 21A) which instructs the operation of a revolving hydraulic motor of a revolving device 4 and an arm operating device 21B (hereinafter referred to as an arm operating lever 21B) as a first working member operating device which instructs the operation of the arm cylinder 16 of the front mechanism 11, for example. The right working lever 22 is configured of a boom operating device 22A (hereinafter referred to as a boom operating lever 22A) which instructs the operation of the boom cylinder 15 of the front mechanism 11 and a bucket operating device 22B (hereinafter referred to as a bucket operating lever 22B) as a second working member operating device which instructs the operation of the bucket cylinder 17 of the front mechanism 11, for example.

As shown in FIG. 2, the left working lever 21 and the right working lever 22 are connected to a controller 61 which will be described later. The left working lever 21 and the right working lever 22 output instructions (operating signals A, B, C) which correspond to an operator's operations, to the controller 61. In FIG. 2, the instruction (boom operating signal) output from the boom operating lever 22A is represented by "A", the instruction (arm operating signal) output from the arm operating lever 21B is represented by "B", and the instruction (bucket operating signal) output from the bucket operating lever 22B is represented by "C". The controller 61 controls a plurality of proportional electromagnetic valves (not shown) based on the operating signals A, B, and C from the operating levers 22A, 21B, and 22B. As a result, hydraulic oil discharged from a pilot pump 35 is output to a control valve device 38 (a boom directional control valve 38A, an arm directional control valve 38B, a bucket directional control valve 38C) via the proportional electromagnetic valves as pilot pressure according to an operator's operation. Thus, an operator is able to drive the hydraulic actuators such as the boom cylinder 15, the arm cylinder 16, and the bucket cylinder 17 (hereinafter also referred to as the cylinders 15, 16, and 17) of the front mechanism 11.

Next, a hydraulic drive device for driving the front mechanism 11 will be described with reference to FIG. 2 to FIG. 5.

As shown in FIG. 2, the hydraulic excavator 1 has a hydraulic circuit 31 which drives the front mechanism 11 based on the hydraulic oil supplied from the hydraulic pump 33. In addition to the cylinders 15, 16 and 17, the left working lever 21 and the right working lever 22, the hydraulic circuit 31 includes an engine 32, the hydraulic pump 33, a hydraulic oil tank 34 (hereinafter referred to as a tank 34), the pilot pump 35, the control valve device 38, a boom cylinder bottom-side pipeline 39 (hereinafter referred to as a BMCB pipeline 39) as a first oil passage, a boom cylinder rod-side pipeline 40 (hereinafter referred to as BMCR pipeline 40), an arm cylinder bottom-side pipeline 41 (hereinafter referred to as AMCB pipeline 41) as a second oil passage, an arm cylinder rod-side pipeline 42 (hereinafter referred to as AMCR pipeline 42) as a third oil passage, a bucket cylinder bottom-side pipeline 43 (hereinafter referred to as BKCB pipeline 43) as a second oil passage, a bucket cylinder rod-side pipeline 44 (hereinafter referred to as BKCR pipeline 44) as a third oil passage, and a connection switching device 45 which includes the controller 61.

Here, the hydraulic circuit 31 in FIG. 2 mainly shows a hydraulic drive device for the front mechanism which drives the cylinders 15, 16, and 17 of the front mechanism 11. In other words, the hydraulic circuit 31 shown in FIG. 2 omits a hydraulic drive device for a traveling device which drives the lower traveling structure 2 and a hydraulic drive device for a revolving device which drives the revolving device 4. Further, in the hydraulic circuit 31, a circuit which relates to an opening/closing cylinder which opens and closes the bucket 14 of the loading type hydraulic excavator is also omitted.

The hydraulic pump 33 is rotationally driven by the engine 32. The hydraulic pump 33 configures a main hydraulic source along with the tank 34 which stores hydraulic oil. The hydraulic pump 33 discharges hydraulic oil to a discharge pipeline 36 called a delivery pipeline. The hydraulic pump 33 supplies hydraulic oil to the cylinders 15, 16, and 17 of the front mechanism 11, that is, the hydraulic pump 33 supplies hydraulic oil to the boom cylinder 15, the arm cylinder 16, and the bucket cylinder 17. Further, the hydraulic pump 33 supplies hydraulic oil to a traveling hydraulic motor of the lower traveling structure 2 and the revolving hydraulic motor of the revolving device 4. The hydraulic pump 33 is driven by the engine 32 to suck the hydraulic oil from the tank 34 and supplies the sucked hydraulic oil to the control valve device 38.

On the other hand, the pilot pump 35 is also rotationally driven by the engine 32. The pilot pump 35 discharges hydraulic oil to a pilot pipeline 37. The pilot pipeline 37 is connected to a proportional electromagnetic valve (not shown) for supplying pilot pressure according to an operator's operation to the control valve device 38. Further, the pilot pipeline 37 is connected to a electromagnetic valve device 54 for supplying pilot pressure to switching valves 46 and 47, which will be described later. The pilot pump 35 which is driven by the engine 32 sucks the hydraulic oil from the tank 34 and supplies the sucked hydraulic oil to the electromagnetic valve device 54, etc.

The control valve device 38 is comprised of a plurality of directional control valves which includes a boom directional control valve 38A, an arm directional control valve 38B as a first working member directional control valve, and a bucket directional control valve 38C as a second working member directional control valve. The control valve device 38 distributes the hydraulic oil discharged from the hydraulic pump 33 to the cylinders 15, 16 and 17, the traveling hydraulic motor and the revolving hydraulic motor according to the operation of various operating devices including the left working lever 21 and the right working lever 22.

The boom directional control valve 38A switches the flow direction of the hydraulic oil supplied from the hydraulic pump 33 to the boom cylinder 15 according to the operating signal A provided by the boom operating lever 22A. In this case, the operating signal A output from the boom operating lever 22A is input to the controller 61 based on the operation of the boom operating lever 22A. The controller 61 controls the proportional electromagnetic valve based on an instruction from the boom operating lever 22A. As a result, the pilot pressure in response to the instruction from the boom operating lever 22A is supplied to the boom directional control valve 38A via the proportional electromagnetic valve. As a result, the boom directional control valve 38A is driven (the spool moves).

The boom directional control valve 38A is configured of a pilot-operated directional control valve, a 5-port 3-position (or 6-port 3-position, 4-port 3-position) hydraulic pilot-type directional control valve, for example. The boom directional control valve 38A switches the supply and discharge of hydraulic oil to the boom cylinder 15 between the hydraulic pump 33 and the boom cylinder 15. Pilot pressure based on the operation of the boom operating lever 22A is supplied to the hydraulic pilot part of the boom directional control valve 38A via a proportional electromagnetic valve. As a result, the switching position of the boom directional control valve 38A changes, and the boom cylinder 15 expands or contracts.

Similarly, the arm directional control valve 38B switches the flow direction of the hydraulic oil supplied from the hydraulic pump 33 to the arm cylinder 16 according to the operating signal B provided from the arm operating lever 21B. The bucket directional control valve 38C switches the flow direction of the hydraulic oil supplied from the hydraulic pump 33 to the bucket cylinder 17 according to the operating signal C provided from the bucket operating lever 22B. Since these arm directional control valve 38B and bucket directional control valve 38C are similar to the boom directional control valve 38A except that the supply destination (cylinder) of hydraulic oil is different, further description thereof will be omitted.

The BMCB pipeline 39 connects the boom directional control valve 38A and the bottom-side oil chamber 15C of the boom cylinder 15. The BMCR pipeline 40 connects the boom directional control valve 38A and the rod-side oil chamber 15D of the boom cylinder 15. The AMCB pipeline 41 connects the arm directional control valve 38B and the bottom-side oil chamber 16C of the arm cylinder 16. The AMCR pipeline 42 connects the arm directional control valve 38B and the rod-side oil chamber 16D of the arm cylinder 16. The BKCB pipeline 43 connects the bucket directional control valve 38C and the bottom-side oil chamber 17C of the bucket cylinder 17. The BKCR pipeline 44 connects the bucket directional control valve 38C and the rod-side oil chamber 17D of the bucket cylinder 17.

Incidentally, according to the previously described arts disclosed in Patent Documents 1 and 2, when the boom cylinder contracts based on the own weight of the boom, the hydraulic oil discharged from the bottom-side oil chamber of the boom cylinder is supplied to the rod-side oil chamber of the boom cylinder. Thus, the lowering operation speed of the boom can be increased. On the other hand, for example, consider supplying the hydraulic oil discharged from the bottom-side oil chamber of the boom cylinder to a working member driving cylinder (for example, an arm cylinder) separate from the boom cylinder. In this case, if the hydraulic circuit is configured such that hydraulic oil is supplied only to one of the bottom-side oil chamber or the rod-side oil chamber of the working member driving cylinder, then there is a possibility that the operation whose speed is capable of increasing by this hydraulic oil may be limited to a partial operation (for example, excavation operation) during the excavation and loading work. Therefore, in the embodiment, the hydraulic circuit is configured such that the supply destination of the hydraulic oil discharged from the bottom-side oil chamber of the boom cylinder is not limited to either the bottom-side oil chamber or the rod-side oil chamber, but can be selected to be the bottom-side oil chamber or the rod-side oil chamber, depending on the situation. In this case, whether the supply destination of the hydraulic oil discharged from the bottom-side oil chamber of the boom cylinder is set to the bottom-side oil chamber or the rod-side oil chamber is determined based on the information of the lever operation during the boom lowering operation and if necessary, the cylinder pressure information.

Therefore, in the embodiment, the hydraulic circuit 31 of the hydraulic excavator 1 has a connection switching device 45. When the boom cylinder 15 contracts, the connection switching device 45 supplies the hydraulic oil in the bottom-side oil chamber 15C of the boom cylinder 15 to at least either one of the bottom-side oil chamber 16C of the arm cylinder 16, the rod-side oil chamber 16D of the arm cylinder 16, the bottom-side oil chamber 17C of the bucket cylinder 17, or the rod-side oil chamber 17D of the bucket cylinder 17. That is, based on the instruction from the boom operating lever 22A and the instruction from the bucket operating lever 22B, the connection switching device 45 connects the bottom-side oil chamber 15C of the boom cylinder 15 to at least either one of the bottom-side oil chamber 16C of the arm cylinder 16, the rod-side oil chamber 16D of the arm cylinder 16, the bottom-side oil chamber 17C of bucket cylinder 17, or the rod-side oil chamber 17D of the bucket cylinder 17.

In this case, when the boom operating lever 22A instructs the contraction of the boom cylinder 15 and the arm operating lever 21B instructs the expansion of the arm cylinder 16, the connection switching device 45 connects the bottom-side oil chamber 15C of the boom cylinder 15 and the bottom-side oil chamber 16C of the arm cylinder 16. When the boom operating lever 22A instructs the contraction of the boom cylinder 15 and the arm operating lever 21B instructs the contraction of the arm cylinder 16, the connection switching device 45 connects the bottom-side oil chamber 15C of the boom cylinder 15 and the rod-side oil chamber 16D of the arm cylinder 16.

Further, when the boom operating lever 22A instructs the contraction of the boom cylinder 15 and the bucket operating lever 22B instructs the expansion of the bucket cylinder 17, the connection switching device 45 connects the bottom-side oil chamber 15C of the boom cylinder 15 and bottom-side oil chamber 17C of the bucket cylinder 17. When the boom operating lever 22A instructs the contraction of the boom cylinder 15 and the bucket operating lever 22B instructs the contraction of the bucket cylinder 17, the connection switching device 45 connects the bottom-side oil chamber 15C of the boom cylinder 15 and the rod-side oil chamber 17D of the bucket cylinder 17.

Thus, the connection switching device 45 is provided with an arm switching valve 46 as a first switching valve, a bucket switching valve 47 as a second switching valve, a boom cylinder bottom-side connecting pipeline 48 (hereinafter referred to as BMCBC pipeline 48) as a first connecting oil passage, an arm cylinder bottom-side connecting pipeline 49 (hereinafter referred to as AMCBC pipeline 49) as a second connecting oil passage, an arm cylinder rod-side connecting pipeline 50 (hereinafter referred to as AMCRC pipeline 50) as a third connecting oil passage, a bucket cylinder bottom-side connecting pipeline 51 (hereinafter referred to as BKCBC pipeline 51) as a second connecting oil passage, a bucket cylinder rod-side connecting pipeline 52 (hereinafter referred to as BKCRC pipeline 52) as a third connecting oil passage, an electromagnetic valve device 54, pressure sensors 55, 56, 57, 58, 59, 60, and the controller 61 as a switching valve control device.

The arm switching valve 46 is configured of a 3-port 3-position hydraulic pilot type directional control valve, for example. The arm switching valve 46 is provided between the boom cylinder 15 and the arm cylinder 16. In other words, the arm switching valve 46 is provided between the BMCB pipeline 39 and the AMCB pipeline 41 and the AMCR pipeline 42. The arm switching valve 46 is connected to the bottom-side oil chamber 15C of the boom cylinder 15 via the BMCBC pipeline 48 and the BMCB pipeline 39. The arm switching valve 46 is connected to the bottom-side oil chamber 16C of the arm cylinder 16 via the AMCBC pipeline 49 and the AMCB pipeline 41. The arm switching valve 46 is connected to the rod-side oil chamber 16D of the arm cylinder 16 via the AMCRC pipeline 50 and the AMCR pipeline 42.

The arm switching valve 46 is switched to one of the following positions: a first switching position, a second switching position, or a shutoff position (neutral position). The first switching position connects the bottom-side oil chamber 15C of the boom cylinder 15 and the bottom-side oil chamber 16C of the arm cylinder 16. When the arm switching valve 46 is in the first switching position, the BMCB pipeline 39 and the AMCB pipeline 41 are connected. The second switching position connects the bottom-side oil chamber 15C of the boom cylinder 15 and the rod-side oil chamber 16D of the arm cylinder 16. When the arm switching valve 46 is in the second switching position, the BMCB pipeline 39 and the AMCR pipeline 42 are connected.

The shutoff position shuts off between the bottom-side oil chamber 15C of the boom cylinder 15 and the bottom-side oil chamber 16C and the rod-side oil chamber 16D of the arm cylinder 16. When the arm switching valve 46 is in the shutoff position, the BMCB pipeline 39 and the AMCB pipeline 41 are shut off, and the BMCB pipeline 39 and the AMCR pipeline 42 are shut off. The arm switching valve 46 is provided with a check valve 46A. The check valve 46A allows the hydraulic oil in the bottom-side oil chamber 15C of the boom cylinder 15 to flow toward the bottom-side oil chamber 16C or the rod-side oil chamber 16D of the arm cylinder 16, and prevents the hydraulic oil to flow in the opposite direction.

Similar to the arm switching valve 46, the bucket switching valve 47 is also configured of a 3-port 3-position hydraulic pilot type directional control valve, for example. The bucket switching valve 47 is provided between the boom cylinder 15 and the bucket cylinder 17. In other words, the bucket switching valve 47 is provided between the BMCB pipeline 39 and the BKCB pipeline 43 and the BKCR pipeline 44. The bucket switching valve 47 is also switched to one of the following positions: the first switching position, the second switching position, or the shutoff position (neutral position). The first switching position connects the bottom-side oil chamber 15C of the boom cylinder 15 and the bottom-side oil chamber 17C of the bucket cylinder 17 by connecting the BMCB pipeline 39 and the BKCB pipeline 43. The second switching position connects the bottom-side oil chamber 15C of the boom cylinder 15 and the rod-side oil chamber 17D of the bucket cylinder 17 by connecting the BMCB pipeline 39 and the BKCR pipeline 44. The shutoff position shuts off between the BMCB pipeline 39 and the BKCB pipeline 43, and also shuts off between the BMCB pipeline 39 and the BKCR pipeline 44. As a result, the shutoff position shuts off between the bottom-side oil chamber 15C of the boom cylinder 15 and the bottom-side oil chamber 17C and the rod-side oil chamber 17D of the bucket cylinder 17. The bucket switching valve 47 is also provided with a check valve 47A.

The BMCBC pipeline 48 connects the BMCB pipeline 39 and the arm switching valve 46 and the bucket switching valve 47. The AMCBC pipeline 49 connects the AMCB pipeline 41 and the arm switching valve 46. The AMCRC pipeline 50 connects the AMCR pipeline 42 and the arm switching valve 46. The BKCBC pipeline 51 connects the BKCB pipeline 43 and the bucket switching valve 47. The BKCRC pipeline 52 connects the BKCR pipeline 44 and the bucket switching valve 47.

The electromagnetic valve device 54 is a group of electromagnetic valves comprised of a plurality of proportional electromagnetic valves 54A, 54B, 54C, 54D. The electromagnetic valve device 54 switches between the arm switching valve 46 and the bucket switching valve 47 based on an instruction from the controller 61. The electromagnetic valve device 54 is provided with proportional electromagnetic valves 54A, 54B for switching the arm switching valve 46 and proportional electromagnetic valves 54C, 54D for switching the bucket switching valve 47. The proportional electromagnetic valves 54A, 54B, 54C, 54D are connected to the controller 61. The proportional electromagnetic valves 54A, 54B, 54C, 54D are controlled by control signals a, b, c, d from the controller 61. That is, by adjusting the opening degree of the proportional electromagnetic valves 54A, 54B in proportion to the current values of the control signals a, b provided from the controller 61, pilot pressures Pa, Pb supplied to the hydraulic pilot section of the arm switching valve 46 change. As a result, the arm switching valve 46 is switched from the shutoff position to the first switching position or the second switching position. By adjusting the opening degree of the proportional electromagnetic valves 54C, 54D in proportion to the current values of the control signals c, d provided from the controller 61, pilot pressures Pc, Pd supplied to the hydraulic pilot section of the bucket switching valve 47 change. As a result, the bucket switching valve 47 is switched from the shutoff position to the first switching position or the second switching position.

The pressure sensors 55, 56, 57, 58, 59, 60 detect the pressures of the cylinders 15, 16 and 17. The pressure sensors 55, 56, 57, 58, 59, 60 are connected to the controller 61. The pressure sensor 55 is a boom cylinder bottom-side oil chamber side pressure sensor. The pressure sensor 55 detects pressure Pe of the bottom-side oil chamber 15C of the boom cylinder 15 and outputs a signal corresponding to the pressure Pe to the controller 61. The pressure sensor 56 is a boom cylinder rod-side oil chamber side pressure sensor. The pressure sensor 56 detects pressure Pf of the rod-side oil chamber 15D of the boom cylinder 15 and outputs a signal corresponding to the pressure Pf to the controller 61. The pressure sensor 57 is an arm cylinder bottom-side oil chamber side pressure sensor. The pressure sensor 57 detects pressure Pg of the bottom-side oil chamber 16C of the arm cylinder 16 and outputs a signal corresponding to the pressure Pg to the controller 61. The pressure sensor 58 is an arm cylinder rod-side oil chamber side pressure sensor. The pressure sensor 58 detects pressure Ph of the rod-side oil chamber 16D of the arm cylinder 16 and outputs a signal corresponding to the pressure Ph to the controller 61. The pressure sensor 59 is a bucket cylinder bottom-side oil chamber side pressure sensor. The pressure sensor 59 detects pressure Pi of the bottom-side oil chamber 17C of the bucket cylinder 17 and outputs a signal corresponding to the pressure Pi to the controller 61. The pressure sensor 60 is a bucket cylinder rod-side oil chamber side pressure sensor. The pressure sensor 60 detects pressure Pj of the rod-side oil chamber 17D of the bucket cylinder 17 and outputs a signal corresponding to the pressure Pj to the controller 61.

The controller 61 switches the control valve device 38 in response to the operating signals from the left working lever 21 and the right working lever 22. In this case, the controller 61 switches the control valve device 38 via a proportional electromagnetic valve which is not shown. Further, the controller 61 switches the arm switching valve 46 and the bucket switching valve 47 based on the operating signals from the left working lever 21 and the right working lever 22 and pressure signals from the pressure sensors 55, 56, 57, 58, 59, 60. In this case, the controller 61 switches the arm switching valve 46 and the bucket switching valve 47 via the electromagnetic valve device 54.

That is, as shown in FIG. 2, a boom operating signal A, an arm operating signal B, and a bucket operating signal C are input to the controller 61 from the operating levers 22A, 21B, and 22B. Further, signals corresponding to pressures Pe, Pf, Pg, Ph, Pi, Pj of each of the chambers 15C, 15D, 16C, 16D, 17C, 17D of the cylinders 15, 16, and 17 are input to the controller 61 from the pressure sensors 55, 56, 57, 58, 59, 60. The controller 61 outputs control signals a, b, c, d to the proportional electromagnetic valves 54A, 54B, 54C, 54D in order to switch the arm switching valve 46 and the bucket switching valve 47 in response to these signals. The proportional electromagnetic valves 54A, 54B, 54C, 54D supply pilot pressures Pa, Pb, Pc, Pd which corresponds to control signals a, b, c, d to the arm switching valve 46 and the bucket switching valve 47.

The controller 61 is configured to include a microprocessor, a drive circuit, a power supply circuit and the like, for example. The controller 61 has memories including a flash memory, a ROM, a RAM, an EEPROM, and the like and an arithmetic circuit (CPU). In the memory, a program used for control processing of the electromagnetic valve device 54 is stored, that is, a processing program for executing the process flow shown in FIG. 4 to be described later is stored.

The controller 61 switches the arm switching valve 46 from the shutoff position to the first switching position when the boom operating lever 22A instructs the contraction of the boom cylinder 15 and the arm operating lever 21B instructs the expansion of the arm cylinder 16. The controller 61 switches the arm switching valve 46 from the shutoff position to the second switching position when the boom operating lever 22A instructs the contraction of the boom cylinder 15 and the arm operating lever 21B instructs the contraction of the arm cylinder 16. In this case, the controller 61 switches the arm switching valve 46 based on the operating signal A from the boom operating lever 22A and the operating signal B of the arm operating lever 21B, and in addition, based on pressure Pg of the bottom-side oil chamber 16C of the arm cylinder 16 or pressure Ph of the rod-side oil chamber 16D of the arm cylinder 16. That is, based on the operating signals and the oil chamber pressure, the connection switching device 45 connects the BMCB pipeline 39 which leads to the bottom-side oil chamber 15C of the boom cylinder 15 to the AMCB pipeline 41 which leads to the bottom-side oil chamber 16C of the arm cylinder 16 or the AMCR pipeline 42 which leads to the rod-side oil chamber 16D of the arm cylinder 16.

The controller 61 switches the bucket switching valve 47 from the shutoff position to the first switching position when the boom operating lever 22A instructs the contraction of the boom cylinder 15 and the bucket operating lever 22B instructs the expansion of the bucket cylinder 17. The controller 61 switches the bucket switching valve 47 from the shutoff position to the second switching position when the boom operating lever 22A instructs the contraction of the boom cylinder 15 and the bucket operating lever 22B instructs the contraction of the bucket cylinder 17. In this case, the controller 61 switches the bucket switching valve 47 based on the operating signal A from the boom operating lever 22A and the operating signal C of the bucket operating lever 22B, and in addition, based on pressure Pi of the bottom-side oil chamber 17C of the bucket cylinder 17 or pressure Pj of the rod-side oil chamber 17D of the bucket cylinder 17. That is, based on the operating signals and the oil chamber pressure, the connection switching device 45 connects the BMCB pipeline 39 which leads to the bottom-side oil chamber 15C of the boom cylinder 15 to the BKCB pipeline 43 which leads to the bottom-side oil chamber 17C of the bucket cylinder 17 or the BKCR pipeline 44 which leads to the rod-side oil chamber 17D of the bucket cylinder 17.

Here, FIG. 5 shows the relationship among operation status of each of the operating levers 22A, 21B, 22B, pressures Pg, Ph, Pi, Pj of the cylinder chambers to which the hydraulic oil in the bottom-side oil chamber 15C of the boom cylinder 15 is supplied, and pilot pressures Pa, Pb, Pc, Pd supplied to the arm switching valve 46 and the bucket switching valve 47. According to the map shown in FIG. 5, the controller 61 controls the pilot pressures supplied to the arm switching valve 46 and the bucket switching valve 47 based on "the instructions of the operating levers 22A, 21B, 22B" and "the pressures of the cylinder chambers to which hydraulic oil is supplied". That is, the controller 61 determines the compound operation which includes lowering of the boom based on operating signals A, B, C provided by the lever operation, and outputs control signals a, b, c, d to the proportional electromagnetic valves 54A, 54B, 54C, 54D when pressures Pg, Ph, Pi, Pj of the bottom-side oil chambers 16C, 17C and rod-side oil chambers 16D, 17D of the cylinders 16, 17 are greater than threshold values $\alpha$, $\beta$, $\gamma$, $\delta$, that is, when the cylinders 16, 17 perform load operation.

The proportional electromagnetic valves 54A, 54B, 54C, 54D receive control signals a, b, c, d and output corresponding pilot pressures Pa, Pb, Pc, Pd to at least one of the arm switching valve 46 or the bucket switching valve 47. The proportional electromagnetic valves 54A, 54B, 54C, 54D output pilot pressures Pa, Pb, Pc, Pd which are proportional to the magnitude of operating signals A, B, C. As a result, the spool of at least one of the arm switching valve 46 or the bucket switching valve 47 moves. Here, the opening area of at least one of the arm switching valve 46 or the bucket switching valve 47 increases in proportion to the pilot pressures Pa, Pb, Pc, Pd. The controller 61 uses a boom lowering operating signal, an arm pushing operating signal, an arm pulling operating signal, a bucket cloud operating signal, and a bucket dump operating signal as variables when converting operating signals A, B, C provided from the lever operation to the control signals a, b, c, d.

Figure 3:
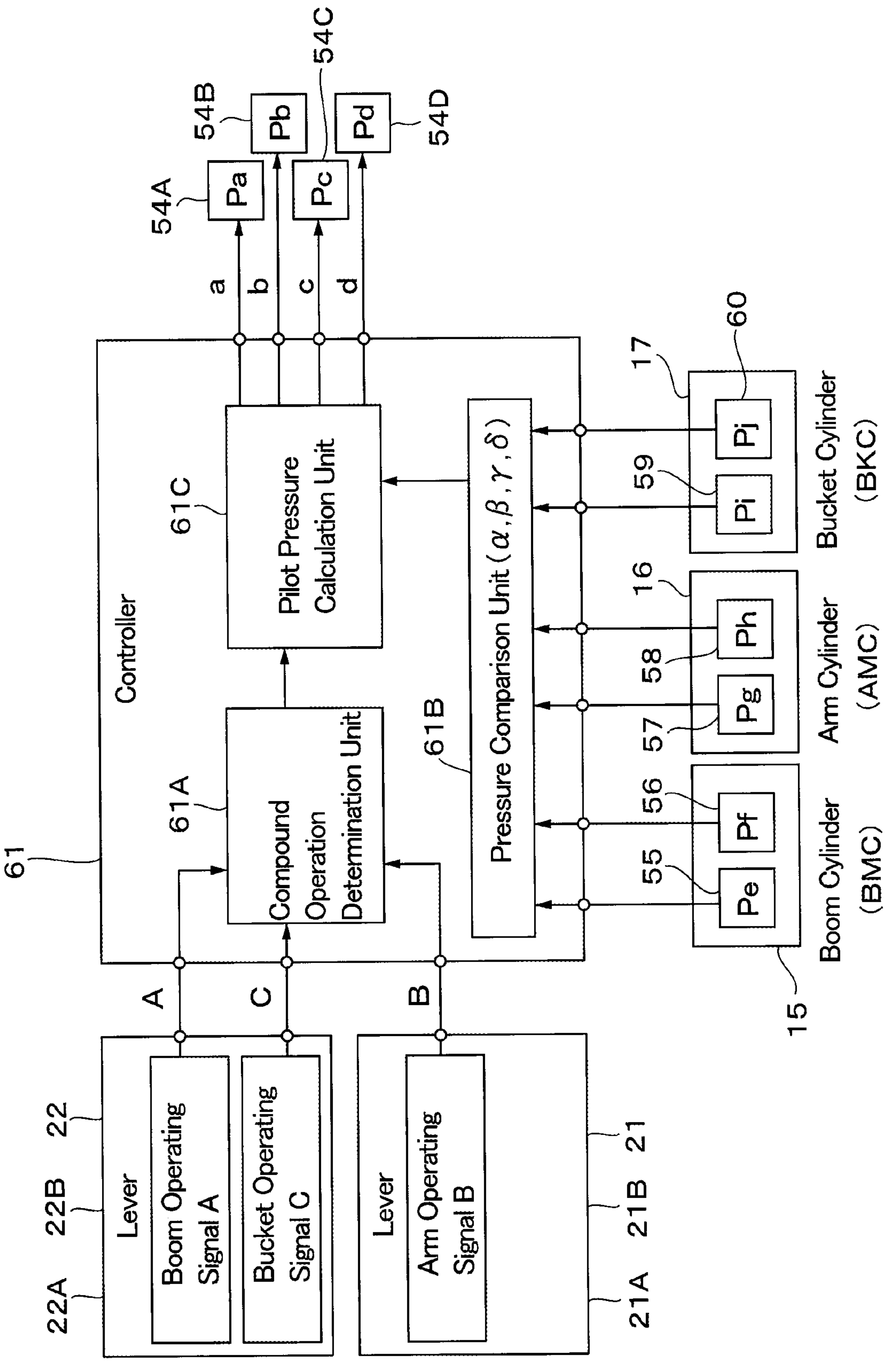
FIG. 3 is a block diagram showing a controller along with operating levers, sensors, and proportional electromagnetic valves shown in FIG. 2.

In order to perform such control, as shown in FIG. 3, the controller 61 is provided with a compound operation determination unit 61A, a pressure comparison unit 61B, and a pilot pressure calculation unit 61C. The input side of the compound operation determination unit 61A is connected to the operating levers 22A, 21B, 22B. The output side of the compound operation determination unit 61A is connected to the pilot pressure calculation unit 61C. Operating signals A, B, C provided from the operating levers 22A, 21B, 22B corresponding to the operation of an operator are input to the compound operation determination unit 61A. The compound operation determination unit 61A determines whether or not the input coincides with the instruction marked with "o" in FIG. 5, that is, it determines whether or not the instruction is a compound operation which includes the boom lowering operation instruction. When the compound operation determination unit 61A determines that the instruction is a compound operation, it outputs the operating signals A, B, C to the pilot pressure calculation unit 61C.

The input side of the pressure comparison unit 61B is connected to pressure sensors 55, 56, 57, 58, 59, 60. The output side of the pressure comparison unit 61B is connected to the pilot pressure calculation unit 61C. Pressure signals corresponding to pressures Pe, Pf, Pg, Ph, Pi, Pj detected by the pressure sensors 55, 56, 57, 58, 59, 60 are input to the pressure comparison unit 61B. The pressure comparison unit 61B compares the threshold values α, β, γ, δ set for each chamber 16C, 16D, 17C, 17D of the cylinders 16, 17 with the pressure values Pg, Ph, Pi, Pj of the pressure sensors 57, 58, 59, 60. Here, the threshold values α, β, γ, δ are set as determination values to determine whether or not a load operation is performed. The threshold values α, β, γ, δ can be set as pressure values which enables to stably determine the load operation, for example. More specifically, the threshold values α, β, γ, δ can be set as pressure values at which the flow velocity of hydraulic oil passing through at least one of the arm switching valve 46 or the bucket switching valve 47 does not become excessively high, even when the hydraulic oil from the boom cylinder 15 is supplied to at least one of the arm cylinder 16 or the bucket cylinder 17.

When pressure value Pg is greater than threshold value α, the hydraulic oil in the bottom-side oil chamber 15C of the boom cylinder 15 can be supplied to the bottom-side oil chamber 16C of the arm cylinder 16. When pressure value Ph is greater than threshold value β, the hydraulic oil in the bottom-side oil chamber 15C of the boom cylinder 15 can be supplied to the rod-side oil chamber 16D of the arm cylinder 16. When pressure value Pi is greater than threshold value γ, the hydraulic oil in the bottom-side oil chamber 15C of the boom cylinder 15 can be supplied to the bottom-side oil chamber 17C of the bucket cylinder 17. When pressure value Pj is greater than threshold value γ, the hydraulic oil in the bottom-side oil chamber 15C of the boom cylinder 15 can be supplied to the rod-side oil chamber 17D of the bucket cylinder 17. When pressure values Pg, Ph, Pi, Pj are greater than threshold values α, β, γ, δ, the pressure comparison unit 61B outputs a permission signal which permits the supply of hydraulic oil to the pilot pressure calculation unit 61C.

The input side of the pilot pressure calculation unit 61C is connected to the compound operation determination unit 61A and the pressure comparison unit 61B. The output side of the pilot pressure calculation unit 61C is connected to the proportional electromagnetic valves 54A, 54B, 54C, 54D. The pilot pressure calculation unit 61C calculates pilot pressures Pa, Pb, Pc, Pd supplied to the arm switching valve 46 and the bucket switching valve 47 based on the operating signals A, B, C from the compound operation determination unit 61A and the permission signal from the pressure comparison unit 61B. The pilot pressure calculation unit 61C outputs control signals a, b, c, d corresponding to the calculated pilot pressures Pa, Pb, Pc, Pd to the proportional electromagnetic valves 54A, 54B, 54C, 54D.

The proportional electromagnetic valves 54A, 54B supply pilot pressures Pa, Pb to the arm switching valve 46 according to the control signals a, b from the controller 61. The proportional electromagnetic valves 54C, 54D supply pilot pressures Pc, Pd to the bucket switching valve 47 according to the control signals c, d from the controller 61. Here, the proportional electromagnetic valves 54A, 54B, 54C, 54D output pilot pressures Pa, Pb, Pc, Pd which are proportional to the magnitude of the control signals a, b, c, d to at least one of the arm switching valve 46 or the bucket switching valve 47. Such switching control of the arm switching valve 46 and the bucket switching valve 47 by the controller 61, that is, the control process shown in FIG. 4 will be described in detail later.

The hydraulic excavator 1 according to the embodiment has the above-described configuration, and the operation thereof will be described next.

When an operator in the cab 6 starts the engine 32, the hydraulic pump 33 is driven by the engine 32. Thereby, the hydraulic oil discharged from the hydraulic pump 33 is supplied to the traveling hydraulic motor, the revolving hydraulic motor, and cylinders 15, 16, and 17 of the front mechanism 11 according to the lever operation and pedal operation of the traveling lever/pedal device (not shown) and working levers 21, 22 provided inside the cab 6. As a result, the hydraulic excavator 1 can perform traveling operation by the lower traveling structure 2, swinging operation of the upper revolving structure 3, and excavation work, etc. by the front mechanism 11.

Next, control process performed by the controller 61 will be described with reference to FIG. 4. Here, for example, the control process of FIG. 4 is repeatedly executed in a predetermined control cycle while the controller 61 is active.

Figure 4:
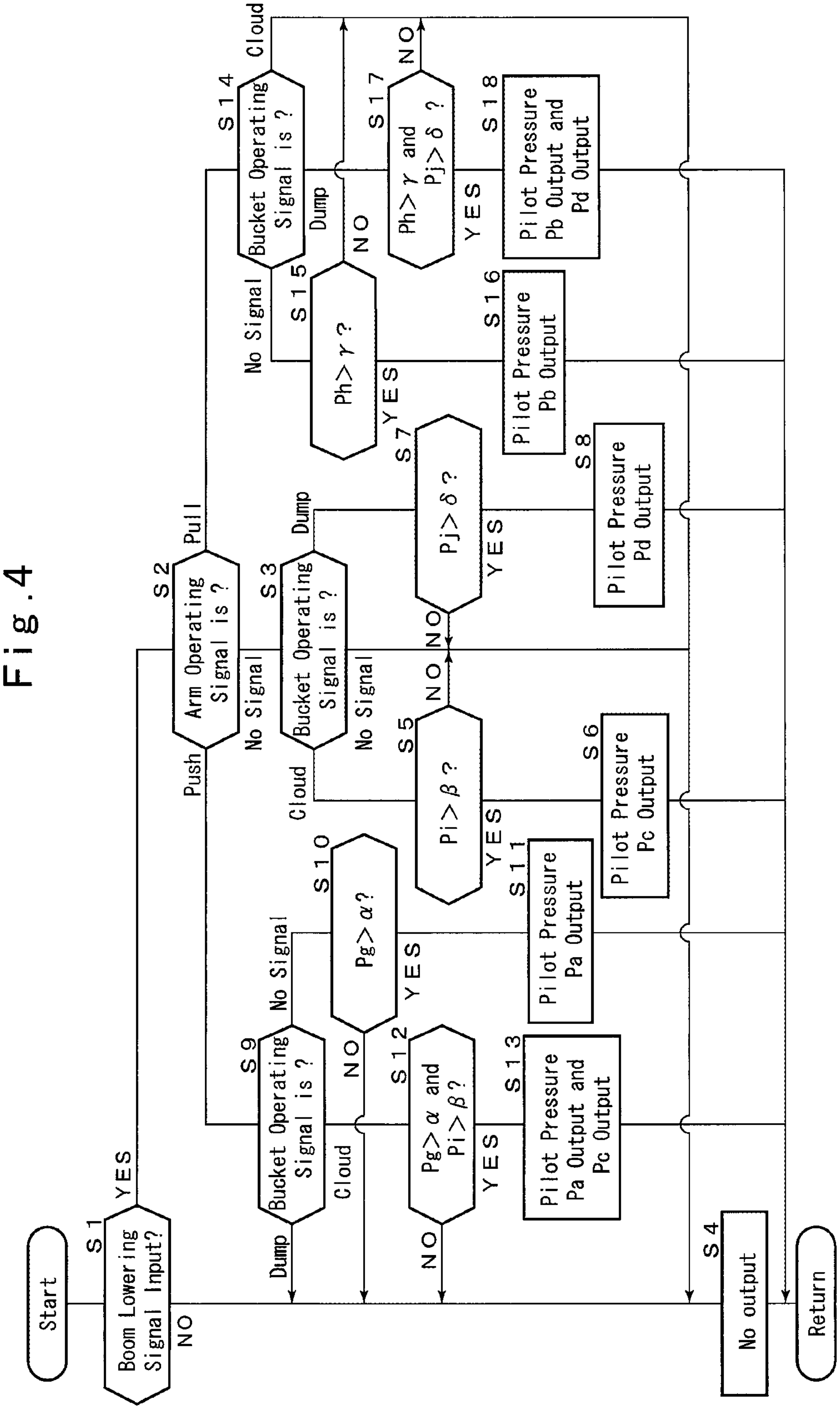
FIG. 4 is a flow chart showing a control process performed by a controller in FIG. 2.

For example, when power supply to the controller 61 is initiated, the controller 61 starts the control process (arithmetic process) shown in FIG. 4. In S1, the controller 61 determines whether or not there is a boom lowering signal input. In S1, when determined as "YES", the process proceeds to S2. On the contrary, in S1, when determined as "NO", the process proceeds to S4. In S4, "no output" is set. In this case, pilot pressures Pa, Pb, Pc, Pd are not output to the arm switching valve 46 and the bucket switching valve 47. That is, in order to set the arm switching valve 46 and the bucket switching valve 47 to the shutoff position, the controller 61 does not output control signals a, b, c, d to the proportional electromagnetic valves 54A, 54B, 54C, 54D. As a result, the opening degree of the proportional electromagnetic valves 54A, 54B, 54C, 54D becomes zero. In S4, when "no output" is set, the process returns. That is, the process returns to "start" via "return", and the control process is repeated from S1.

On the other hand, in S2, the controller 61 determines whether the arm operating signal is either "push", "pull", or "no signal". In S2, when determined as "no signal", the process proceeds to S3. In S2, when determined as "push", that is, when it is determined that there is an arm push signal input, the process proceeds to S9. In S2, when determined as "pull", that is, when it is determined that there is an arm pull signal input, the process proceeds to S14. In S3, the controller 61 determines whether the bucket operating signal is either "cloud", "dump", or "no signal". In S3, when determined as "no signal", the process proceeds to S4. In S3, when determined as "cloud", that is, when it is determined that there is a bucket cloud signal input, the process proceeds to S5. In S3, when determined as "dump", that is, when it is determined that there is a bucket dump signal input, the process proceeds to S7.

In S5, the controller 61 determines whether or not pressure Pi of the bottom-side oil chamber 17C of the bucket cylinder 17 is greater than threshold value β. That is, when the process proceeds to S5, it corresponds to a case where contraction of the boom cylinder 15 is instructed and expansion of the bucket cylinder 17 is instructed. In this case, it is preferable to effectively utilize hydraulic oil when the boom cylinder 15 contracts based on the weight of the boom 12, by supplying the hydraulic oil in the bottom-side oil chamber 15C of the boom cylinder 15 to the bottom-side oil chamber 17C of the bucket cylinder 17. However, when the controller 61 supplies the hydraulic oil in the bottom-side oil chamber 15C of the boom cylinder 15 to the bottom-side oil chamber 17C of the bucket cylinder 17 while the pressure of the bottom-side oil chamber 17C of the bucket cylinder 17 is low, that is, while the load of the bucket cylinder 17 is low, there is a possibility that the flow velocity of the hydraulic oil passing through the bucket switching valve 47 may increase, and durability of the bucket switching valve 47 may decrease.

Therefore, In S5, the controller 61 permits to switch the bucket switching valve 47 when pressure Pi is greater than threshold value β. That is, in S5, when determined as "NO", the process proceeds to S4. On the other hand, in S5, when determined as "YES", the process proceeds to S6. In S6, pilot pressure Pc is output to the bucket switching valve 47. That is, the controller 61 outputs control signal c to the proportional electromagnetic valve 54C in order to set the bucket switching valve 47 to the first switching position. As a result, the hydraulic oil in the bottom-side oil chamber 15C of the boom cylinder 15 is supplied to the bottom-side oil chamber 17C of the bucket cylinder 17, and the hydraulic oil from the boom cylinder 15 based on the own weight of the boom 12 can be effectively utilized in the bucket cylinder 17. In S6, when pilot pressure Pc is output, the process returns.

In S7, the controller 61 determines whether or not pressure Pj of the rod-side oil chamber 17D of the bucket cylinder 17 is greater than threshold value δ. That is, when the process proceeds to S7, it corresponds to a case where contraction of the boom cylinder 15 is instructed and contraction of the bucket cylinder 17 is instructed. In this case, it is preferable to effectively utilize the hydraulic oil from the boom cylinder 15 based on the own weight of the boom 12 for the contraction of the bucket cylinder 17 by supplying the hydraulic oil in the bottom-side oil chamber 15C of the boom cylinder 15 to the rod-side oil chamber 17D of the bucket cylinder 17. Here, in order to suppress decrease in durability of the bucket switching valve 47 due to increase of the flow rate of the hydraulic oil, in S7, the controller 61 permits to switch the bucket switching valve 47 when pressure Pj is greater than threshold value δ. That is, in S7, when determined as "NO", the process proceeds to S4. On the other hand, in S7, when determined as "YES", the process proceeds to S8. In S8, pilot pressure Pd is output to the bucket switching valve 47. That is, the controller 61 outputs control signal d to the proportional electromagnetic valve 54C in order to set the bucket switching valve 47 to the second switching position. As a result, the hydraulic oil in the bottom-side oil chamber 15C of the boom cylinder 15 is supplied to the rod-side oil chamber 17D of the bucket cylinder 17, and the hydraulic oil from the boom cylinder 15 based on the own weight of the boom 12 can be effectively utilized in the bucket cylinder 17. In S8, when the pilot pressure Pd is output, the process returns.

In S9, the controller 61 determines whether the bucket operating signal is either "cloud", "dump", or "no signal". In S9, when determined as "dump", the process proceeds to S4. In S9, when determined as "no signal", the process proceeds to S10. In S10, the controller 61 determines whether or not pressure Pg of the bottom-side oil chamber 16C of the arm cylinder 16 is greater than threshold value α. That is, when the process proceeds to S10, it corresponds to a case where contraction of the boom cylinder 15 is instructed and expansion of the arm cylinder 16 is instructed. In this case, by supplying the hydraulic oil in the bottom-side oil chamber 15C of the boom cylinder 15 to the bottom-side oil chamber 16C of the arm cylinder 16, the hydraulic oil from the boom cylinder 15 based on the own weight of the boom 12 is effectively utilized for the expansion of the arm cylinder 16. Here, in order to suppress decrease in durability of the arm switching valve 46 due to increase in the flow velocity of the hydraulic oil, in S10, the controller 61 permits to switch the arm switching valve 46 when pressure Pg is greater than threshold value α.

That is, in S10, when determined as "NO", the process proceeds to S4. On the other hand, in S10, when determined as "YES", the process proceeds to S11. In S11, pilot pressure Pa is output to the arm switching valve 46. That is, in order to set the arm switching valve 46 to the first switching position, the controller 61 outputs control signal a to the proportional electromagnetic valve 54A. As a result, the hydraulic oil in the bottom-side oil chamber 15C of the boom cylinder 15 is supplied to the bottom-side oil chamber 16C of the arm cylinder 16, and the hydraulic oil from the boom cylinder 15 based on the own weight of the boom 12 can be effectively utilized in the arm cylinder 16. In S11, when pilot pressure Pa is output, the process returns.

In S9, when determined as "cloud", the process proceeds to S12. In S12, the controller 61 determines whether or not pressure Pg of the bottom-side oil chamber 16C of the arm cylinder 16 is greater than threshold value α and determines whether or not pressure Pi of the bottom-side oil chamber 17C of the bucket cylinder 17 is greater than threshold value β. That is, when the process proceeds to S12, it corresponds to a case where contraction of the boom cylinder 15 is instructed, expansion of the arm cylinder 16 is instructed, and expansion of the bucket cylinder 17 is instructed. In this case, by supplying the hydraulic oil in the bottom-side oil chamber 15C of the boom cylinder 15 to the bottom-side oil chamber 16C of the arm cylinder 16 and the bottom-side oil chamber 17C of the bucket cylinder 17, the hydraulic oil from the boom cylinder 15 based on the own weight of the boom 12 is effectively utilized for the expansion of the arm cylinder 16 and the expansion of the bucket cylinder 17.

Here, in order to suppress decrease in durability of the arm switching valve 46 and the bucket switching valve 47 due to increase in the flow velocity of the hydraulic oil, in S12, when pressure Pg is greater than threshold value α and pressure Pi is greater than threshold value β, the controller 61 permits to switch the arm switching valve 46 and the bucket switching valve 47. That is, in S12, when determined as "NO", the process proceeds to S4. On the other hand, in S12, when determined as "YES", the process proceeds to S13. In S13, pilot pressure Pa is output to the arm switching valve 46 and pilot pressure Pc is output to the bucket switching valve 47. That is, in order to set the arm switching valve 46 to the first switching position and the bucket switching valve 47 to the first switching position, the controller 61 outputs control signal a to the proportional electromagnetic valve 54A and outputs control signal c to the proportional electromagnetic valve 54C.

As a result, the hydraulic oil in the bottom-side oil chamber 15C of the boom cylinder 15 is supplied to the bottom-side oil chamber 16C of the arm cylinder 16 and the bottom-side oil chamber 17C of the bucket cylinder 17, and the hydraulic oil based on the own weight of the boom 12 can be effectively utilized in the arm cylinder 16 and the bucket cylinder 17. In S13, when pilot pressure Pa and pilot pressure Pc are output, the process returns. Here, since the process from S14 to S18 is similar to the process from S9 to S13 except that the arm push signal becomes an arm pull signal, the description thereof will be omitted.

As described above, according to the embodiment, based on the instruction from the boom operating lever 22A (boom lowering instruction) and the instruction from the arm operating lever 21B (arm pushing instruction, arm pulling instruction), the connection switching device 45 switches to either "connect the bottom-side oil chamber 15C of the boom cylinder 15 to the bottom-side oil chamber 16C of the arm cylinder 16" or "connect the bottom-side oil chamber 15C of the boom cylinder 15 to the rod-side oil chamber 16D of the arm cylinder 16". Therefore, for example, in both "situation in which the boom cylinder 15 contraction operation and the arm cylinder 16 expansion operation are performed at the same time" and "situation in which the boom cylinder 15 contraction operation and the arm cylinder 16 expansion/contraction operations are performed at the same time", the operation speed of the arm cylinder 16 can be increased. The same applies to the bucket cylinder 17. Therefore, increase of operation speed can be achieved not only for a partial operation during excavation and loading work, but also for operations that are frequently used during the operation from the time after the earth and sand are discharged to the dump truck till the time when the machine returns to the position to start the excavation work. As a result, the hydraulic oil discharged from the boom cylinder 15 based on the own weight of the boom 12 can be utilized more effectively, and work efficiency can be improved. That is, the potential energy of the front mechanism 11 can be utilized to drive the arm cylinder 16 and the bucket cylinder 17, thereby, energy saving can be achieved.

According to the embodiment, the connection switching device 45 is provided with an arm switching valve 46 having a "first switching position", a "second switching position" and a "shutoff position", and the controller 61 which switches the arm switching valve 46 from the "shutoff position" to the "first switching position" or the "second switching position". Thus, by switching the arm switching valve 46 based on the instruction from the boom operating lever 22A and the instruction from the arm operating lever 21B, the controller 61 is capable of connecting the "bottom-side oil chamber 15C of the boom cylinder 15" to the "bottom-side oil chamber 16C of arm cylinder 16" or the "rod-side oil chamber 16D of arm cylinder 16". As a result, in both "situation in which the boom cylinder 15 contraction operation and the arm cylinder 16 expansion operation are performed at the same time" and "situation in which the boom cylinder 15 contraction operation and the arm cylinder 16 expansion/contraction operation are performed at the same time", the operation speed of the arm cylinder 16 can be stably increased. Further, since the connection switching device 45 is also provided with a bucket switching valve 47, the same applies to the bucket cylinder 17.

According to the embodiment, in addition to the instruction from the boom operating lever 22A and the instruction from the arm operating lever 21B, based on the pressure of the bottom-side oil chamber 16C of the arm cylinder 16 or the pressure of the rod-side oil chamber 16D of the arm cylinder 16, the connection switching device 45 connects "the bottom-side oil chamber 15C of boom cylinder 15" to "the bottom-side oil chamber 16C of arm cylinder 16" or "the rod-side oil chamber 16D of arm cylinder 16". Thus, when the pressure difference between the bottom-side oil chamber 15C of the boom cylinder 15 and the bottom-side oil chamber 16C of the arm cylinder 16 is large, or when the pressure difference between the bottom-side oil chamber 15C of the boom cylinder 15 and the rod-side oil chamber 16D of the arm cylinder 16 is large, the connection switching device 45 is capable of not connecting these chambers. Therefore, it is possible to prevent the flow velocity of the hydraulic oil passing through the arm switching valve 46 from becoming excessively high due to the large pressure difference. As a result, durability of the arm switching valve 46 can be improved. The same applies to the bucket cylinder 17.

According to the embodiment, the hydraulic circuit is configured so that it can supply the hydraulic oil discharged from the bottom-side oil chamber 15C of the boom cylinder 15 not only to the bottom-side oil chamber 16C or the rod-side oil chamber 16D of the arm cylinder 16, but also to the bottom-side oil chamber 17C or the rod-side oil chamber 17D of the bucket cylinder 17. Therefore, in a "situation where boom lowering operation and arm pushing operation are performed at the same time", in a "situation where boom lowering operation and arm pulling operation are performed at the same time", in a "situation where boom lowering operation and bucket cloud operation are performed at the same time", and in a "situation where boom lowering operation and bucket dump operation are performed at the same time", the speed of the arm 13 or the bucket 14 can be increased. That is, when performing "compound operation of boom lowering and arm pushing", "compound operation of boom lowering and bucket cloud", "compound operation of boom lowering and arm pulling", or "compound operation of boom lowering and bucket dump", by supplying the hydraulic oil discharged from the bottom-side oil chamber 15C of the boom cylinder 15 to the arm cylinder 16 or the bucket cylinder 17, the operating speed of the arm 13 or the bucket 14 can be increased. Further, even in a "situation where both the arm 13 and the bucket 14 are operated in addition to the boom lowering operation", the operating speed of the arm 13 and the bucket 14 can be increased. As a result, work efficiency can be further improved.

Here, in the case of loading type hydraulic excavator 1, since the arm pulling operation and the bucket dump operation are mostly operated by their own weight, there is a possibility that the pressure in the cylinder chamber to which the hydraulic oil discharged from the bottom-side oil chamber 15C of the boom cylinder 15 is supplied may not increase sufficiently. Therefore, it is also possible to supply the hydraulic oil discharged from the bottom-side oil chamber 15C of the boom cylinder 15 by narrowing the meter-out oil passage of each operation in order to intentionally create a load condition.

In the embodiment, the hydraulic circuit is configured so that it can supply the hydraulic oil discharged from the bottom-side oil chamber 15C of the boom cylinder 15 to both the bottom-side oil chamber 16C or rod-side oil chamber 16D of the arm cylinder 16 and the bottom-side oil chamber 17C or rod-side oil chamber 17D of the bucket cylinder 17. That is, in the embodiment, a case has been described as an example where the working member corresponds to the arm 13 and the bucket 14, the working member driving cylinder corresponds to the arm cylinder 16 and the bucket cylinder 17, the working member operating device corresponds to the arm operating lever 21B and the bucket operating lever 22B, and the working member directional control valve corresponds to the arm directional control valve 38B and the bucket directional control valve 38C.

However, the disclosure is not limited thereto, and for example, the working member may correspond to an arm, the working member driving cylinder may correspond to an arm cylinder, the working member operating device may correspond to an arm operating lever, and the working member directional control valve may correspond to an arm directional control valve. That is, the hydraulic circuit may be configured so that the hydraulic oil discharged from the bottom-side oil chamber of the boom cylinder is not supplied to the bucket cylinder, that is, a configuration in which an arm switching valve is provided but a bucket switching valve is not provided may be allowed. In this case, in addition to a "situation where boom lowering operation and arm pushing operation are performed at the same time", the arm speed can be increased in a "situation where boom lowering operation and arm pulling operation are performed at the same time".

Meanwhile, the working member may correspond to a bucket, the working member driving cylinder may correspond to a bucket cylinder, the working member operating device may correspond to a bucket operating lever, and the working member directional control valve may correspond to a bucket directional control valve. That is, the hydraulic circuit may be configured so that the hydraulic oil discharged from the bottom-side oil chamber of the boom cylinder is not supplied to the arm cylinder, that is, a configuration in which a bucket switching valve is provided but an arm switching valve is not provided may be allowed. In this case, in addition to a "situation where boom lowering operation and bucket cloud operation are performed at the same time", bucket speed can be increased in a "situation where boom lowering operation and bucket dump operation are performed at the same time".

In either case, increase of operation speed can be achieved not only for a partial operation during excavation and loading work, but also for operations that are frequently used during the operation from the time after the earth and sand are discharged to the dump truck till the time when the machine returns to the position to start the excavation work. Therefore, the hydraulic oil discharged from the boom cylinder based on the own weight of the boom can be utilized more effectively in the arm operation or the bucket operation, and work efficiency can be improved.

In the embodiment, a case has been described as an example where the hydraulic oil discharged from the bottom-side oil chamber 15C of the boom cylinder 15 is supplied to the bottom-side oil chamber 16C and the rod-side oil chamber 16D of the arm cylinder 16. Further, in the embodiment, a case has been described where the hydraulic oil discharged from the bottom-side oil chamber 15C of the boom cylinder 15 is supplied to the bottom-side oil chamber 17C and the rod-side oil chamber 17D of the bucket cylinder 17. However, the present disclosure is not limited thereto, and a cylinder other than an arm cylinder or a bucket cylinder such as an opening/closing cylinder may be used as a working member driving cylinder.

In the embodiment, a case has been described as an example where the front mechanism 11 is configured to include a boom 12, an arm 13, a bucket 14, a boom cylinder 15, an arm cylinder 16, and a bucket cylinder 17, that is, where the front mechanism 11 is configured to include a boom, two working members, a boom cylinder and two working member driving cylinders. However, the present disclosure is not limited thereto, and for example, the front mechanism may be configured to include a boom, one working member, a boom cylinder, and one working member driving cylinder. Further, the front mechanism may be configured to include a boom, three or more working members, a boom cylinder, and three or more working member driving cylinders. In summary, the number of working members, the number of working member driving cylinders, the number of working member operating devices, the number of working member directional control valves, and the number of switching valves can be increased or decreased depending on the configuration of the front mechanism.

In the embodiment, as an example of a work machine, an engine-type hydraulic excavator 1 driven by an engine 32 has been described. However, the present disclosure is not limited thereto, and may be applied to, for example, a hybrid type hydraulic excavator driven by an engine and an electric motor, and further, may be applied to a hydraulic excavator driven by an electric motor.

In the embodiment, as an example of a work machine, a super-large hydraulic excavator 1 has been described, but the present disclosure is not limited thereto, and may be applied to various sized (large, medium, small) hydraulic excavators. Further, as an example, a crawler type hydraulic excavator 1 has been described, but the description is not limited thereto, and the present disclosure may be applied to a wheel type hydraulic excavator, for example. Further, a loading type hydraulic excavator 1 has been described, but the present disclosure may be applied to a back-hoe type hydraulic excavator, for example. That is, the present disclosure is not limited to the hydraulic excavator 1 disclosed in the embodiment, and can be widely applied to various work machines.

DESCRIPTION OF REFERENCE NUMERALS

1: Hydraulic excavator (Work machine)
11: Front mechanism
12: Boom
13: Arm (Working member)
14: Bucket (Working member)
15: Boom cylinder
15C: Bottom-side oil chamber
16: Arm cylinder (Working member driving cylinder)
16C: Bottom-side oil chamber
16D: Rod-side oil chamber
17: Bucket cylinder (Working member driving cylinder)
17C: Bottom-side oil chamber
17D: Rod-side oil chamber
21B: Arm operating lever (Working member operating device)
22A: Boom operating lever (Boom operating device)
22B: Bucket operating lever (Working member operating device)
33: Hydraulic pump
38A: Boom directional control valve
38B: Arm directional control valve (Working member directional control valve)
38C: Bucket directional control valve (Working member directional control valve)
39: BMCB pipeline (First oil passage)
41: AMCB pipeline (Second oil passage)
42: AMCR pipeline (Third oil passage)
43: BKCB pipeline (Second oil passage)

44: BKCR pipeline (Third oil passage)
45: Connection switching device
46: Arm switching valve (Switching valve)
47: Bucket switching valve (Switching valve)
48: BMCBC pipeline (First connecting oil passage)
49: AMCBC pipeline (Second connecting oil passage)
50: AMCRC pipeline (Third connecting oil passage)
51: BKCBC pipeline (Second connecting oil passage)
52: BKCRC pipeline (Third connecting oil passage)
61: Controller (Switching valve control device)

The invention claimed is:

1. A work machine comprising:

a front mechanism which is configured to include a boom, a boom cylinder which drives the boom, a first working member, a first working member driving cylinder which drives the first working member, a second working member, and a second working member driving cylinder which drives the second working member, a hydraulic pump which is configured to supply a hydraulic oil to the boom cylinder and the first working member driving cylinder and the second working member driving cylinder, a boom operating device which is configured to instruct the operation of the boom cylinder, a first working member operating device which is configured to instruct the operation of the first working member driving cylinder, a second working member operating device which is configured to instruct the operation of the second working member driving cylinder, a boom directional control valve which is configured to switch flow direction of the hydraulic oil supplied from the hydraulic pump to the boom cylinder in response to the instruction from the boom operating device, a first working member directional control valve which is configured to switch flow direction of the hydraulic oil supplied from the hydraulic pump to the first working member driving cylinder in response to the instruction from the first working member operating device, and a second working member directional control valve which is configured to switch flow direction of the hydraulic oil supplied from the hydraulic pump to the second working member driving cylinder in response to the instruction from the second working member operating device, characterized in that:

the work machine further includes a connection switching device configured to connect a bottom-side oil chamber of the boom cylinder and a bottom-side oil chamber of the first working member driving cylinder and a bottom-side oil chamber of the second working member driving cylinder when the boom operating device instructs the contraction of the boom cylinder, the first working member operating device instructs the expansion of the first working member driving cylinder, and the second working member operating device instructs the expansion of the second working member driving cylinder, or to connect the bottom-side oil chamber of the boom cylinder and a rod-side oil chamber of the first working member driving cylinder and a rod-side oil chamber of the second working member driving cylinder when the boom operating device instructs the contraction of the boom cylinder, the first working member operating device instructs the contraction of the first working member driving cylinder, and the second working member operating device instructs the contraction of the second working member driving cylinder, wherein the connection switching device connects the bottom-side oil chamber of the boom cylinder to the bottom-side oil chamber or the rod-side oil chamber of the first and second working member driving cylinders based on the instruction from the boom operating device and the instructions from the first and second working member operating devices, and in addition, when the pressure of the bottom-side oil chamber or the pressure of the rod-side oil chamber of the first and second working member driving cylinders is greater than a threshold value which determines whether or not the load operation is performed, wherein the connection switching device further includes:

a first switching valve which is provided between the boom cylinder and the first working member driving cylinder and is capable of switching to either a first switching position configured to connect the bottom-side oil chamber of the boom cylinder and the bottom-side oil chamber of the first working member driving cylinder, a second switching position configured to connect the bottom-side oil chamber of the boom cylinder and the rod-side oil chamber of the first working member driving cylinder, or a shutoff position configured to shut off between the bottom-side oil chamber of the boom cylinder and the bottom-side oil chamber and the rod-side oil chamber of the first working member driving cylinder;

a second switching valve which is provided between the boom cylinder and the second working member driving cylinder and is capable of switching to either a first switching position configured to connect the bottom-side oil chamber of the boom cylinder and the bottom-side oil chamber of the second working member driving cylinder, a second switching position configured to connect the bottom-side oil chamber of the boom cylinder and the rod-side oil chamber of the second working member driving cylinder, or a shutoff position configured to shut off between the bottom-side oil chamber of the boom cylinder and the bottom-side oil chamber and the rod-side oil chamber of the second working member driving cylinder; and a switching valve control device that switches the first and the second switching valves to the first switching position when the boom operating device instructs the contraction of the boom cylinder, the first working member operating device instructs the expansion of the first working member driving cylinder, and the second working member operating device instructs the expansion of the second working member driving cylinder, or the second switching position when the boom operating device instructs the contraction of the boom cylinder, the first working member operating device instructs the contraction of the first working member driving cylinder, and the second working member operating device instructs the contraction of the second working member driving cylinder.

2. The work machine according to claim 1, wherein the first working member is an arm and the second working member is a bucket, wherein the first working member driving cylinder is an arm cylinder and the second working member driving cylinder is a bucket cylinder, wherein the first working member operating device is an arm operating device and the second working member operating device is a bucket operating device, and wherein the first working member directional control valve is an arm directional control valve and the second working member directional control valve is a bucket directional control valve.

3. The work machine according to claim 1, wherein the first switching valve and the second switching valve are switched by a plurality of proportional electromagnetic valves controlled by a control signal provided from the switching valve control device.

* * * * *